United States Patent
Ganesh et al.

(10) Patent No.: US 6,353,828 B1
(45) Date of Patent: Mar. 5, 2002

(54) CONCURRENCY CONTROL FOR TRANSACTIONS THAT UPDATE BASE TABLES OF A MATERIALIZED VIEW USING DIFFERENT TYPES OF LOCKS

(75) Inventors: Amit Ganesh, Mountain View; Andrew Witkowski, Foster City, both of CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/311,273

(22) Filed: May 14, 1999

(51) Int. Cl.7 .............................................. G06F 17/30
(52) U.S. Cl. ............................ 707/8; 707/10; 707/201
(58) Field of Search ............................. 707/1–3, 8, 9, 707/10, 100–104, 200–203; 711/148; 710/1, 200, 244, 240, 108; 709/213, 220

(56) References Cited

U.S. PATENT DOCUMENTS

| | | | |
|---|---|---|---|
| 5,333,316 A | * 7/1994 | Champagne et al. ........... | 707/8 |
| 5,459,862 A | * 10/1995 | Garliepp et al. ................ | 707/8 |
| 5,566,319 A | * 10/1996 | Lenz ............................ | 711/147 |
| 5,596,754 A | * 1/1997 | Lomet ......................... | 710/200 |
| 5,692,178 A | * 11/1997 | Shaughnessy ................. | 707/8 |
| 5,794,241 A | * 8/1998 | Loaiza ........................... | 707/8 |
| 5,870,758 A | * 2/1999 | Bamford et al. ............ | 707/201 |
| 5,940,828 A | * 8/1999 | Anaya et al. .................. | 707/8 |
| 5,978,796 A | * 11/1999 | Malloy et al. ................. | 707/3 |
| 6,006,216 A | * 12/1999 | Griffin et al. .................. | 707/2 |
| 6,105,026 A | * 8/2000 | Kruglikov et al. ............. | 707/8 |
| 6,182,186 B1 | * 1/2001 | Daynes ....................... | 710/200 |
| 6,185,562 B1 | * 2/2001 | Dahlen et al. ................. | 707/8 |

OTHER PUBLICATIONS

Ross K.A et al., Materialized view maintenance and integrity constraint checking:trading space for time, SIGMOD Record conference, vol. 25, No. 2, ACM, Jun. 1996, and 447–458.*

Alexandros Labrinidis et al., University of Maryland, Depart of Computer Science Techical Report#3878 [CS–TR–3878], Feb. 1998, pp. 1–21.*

Randall G.Bello et al., Materialized views in Oracle, proceedings of the 24th VLDB conference new york, 1998, pp. 659–664.*

* cited by examiner

*Primary Examiner*—Jack Choules
*Assistant Examiner*—Srirama Channavajjala
(74) *Attorney, Agent, or Firm*—Ditthavong & Carlson, P.C.

(57) ABSTRACT

Concurrency control for maintenance of materialized view defined as a join on a plurality of base tables is provided by obtaining different types of locks. The base table being updated is locked with one type of lock, and the other base tables of the materialized view is locked with a different type of lock. These lock types are defined so that another process attempting to update another base table simultaneously is blocked until the update on the base table is committed. On the other hand, another process attempting to update the same base table is allowed to perform that update concurrently.

20 Claims, 5 Drawing Sheets

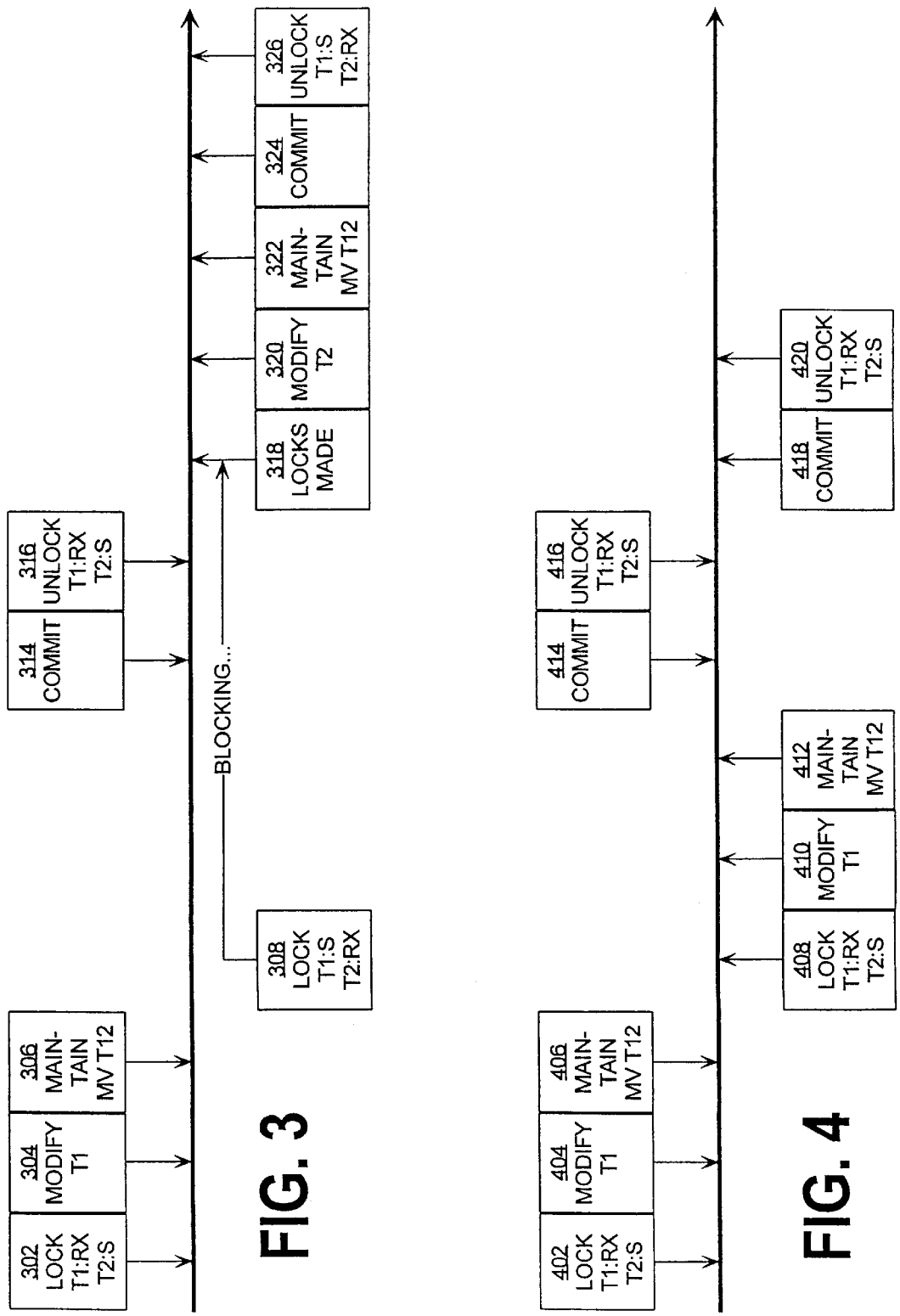

CONCURRENCY CONTROL FOR TRANSACTIONS THAT UPDATE BASE TABLES OF A MATERIALIZED VIEW USING DIFFERENT TYPES OF LOCKS

FIELD OF THE INVENTION

The present invention relates to database systems and more particularly to concurrency control for maintenance of materialized views.

BACKGROUND OF THE INVENTION

Relational databases store information in collections of tables, in which each table is organized into rows and columns. A popular application of relational database technology is data warehousing, in which an organization's data repository is designed to support the decision-making process for the organization. Many data warehouses are characterized by a schema having a very large table called a "fact table" and many smaller lookup tables called "dimension tables." A fact table contains information collected for analysis and dimension tables contain information about the attributes of the data in the large fact table.

FIG. 5 illustrates an exemplary database containing two tables, a product table 500 and a sales table 510, useful for recording and organizing information about a company's sales operation. The columns of the product table 500 hold attributes for the different products sold by the company, including a product number "PRODNO" 502, and a product name "PNAME" 404. Information about each product is stored in a row. For example, the first row is an entry for product 11, which is peanuts. The sales table 410 holds information in columns for each sale of products made by the company. Such information may include, for example, the number of tons 412 of product in the sale, and the product number 414 of the product that was sold. In this example, the sales table 510 may be considered to be a fact table because the sales information is useful in analysis of profitability, and the product table 400 is an example of a dimension table because it stores information about the product number attribute 414.

A database user retrieves information from the tables of a relational database by entering input that is converted to queries by a database application, which submits the queries to a database server. In response to receiving a query, the database server accesses the tables specified in the query to determine which information within the tables satisfies the query. The information that satisfies the queries is then retrieved by the database server and transmitted to the database application and ultimately presented to the user. Database servers are also capable of combining or "aggregating" information contained in different tables in response to a query. For example, one query for the exemplary database is to list, for each sale, the tonnage sold from the sales table 410 and the corresponding name of the product sold from the product table 400. This query would be useful for users who don't remember the meaning of the product numbers.

For any given database application, the queries must conform to the rules of a particular query language. Most query languages provide users with a variety of ways to specify information to be retrieved. For example, in the Structured Query Language (SQL), the following query requests the retrieval of a list, for each sale, of the tonnage sold and the name of the product sold:

STATEMENT 1

SELECT TONS, PNAME
FROM PRODUCT, SALES
WHERE PRODUCT.PRODNO=SALES.PRODNO;

This query performs a join operation on the product table 500 and the sales table 510. A join operation combines rows from two or more relational database objects, such as tables, views, or snapshots. To process a join operation, the database server combines pairs of rows that satisfy the join conditions and the other predicates. A join is performed whenever multiple tables appear in the FROM clause of query. The SELECT list of the query can reference any of the columns from any of the base objects listed in the FROM clause. Most join queries contain a WHERE clause that contains a predicate that compares two columns, each from a different joined object. Such predicates are referred to join conditions.

For various reasons, it is desirable to define views that present results of queries. For example, views are often used to provide security by hiding sensitive information or simplify commands for a user by hiding the complexity of the database. A view is a logical table, and as logical tables, views can be queried just as if they were tables. The data that views actually present, however, is extracted or derived from other database objects, which may in fact be tables, other views, or snapshots. Columns and tables that are mapped to a view are referred to herein as base columns and base tables of the view, respectively.

A view is defined by metadata referred to as a view definition, which is typically in the form of a database query. For example, to create a view "RESULTS", illustrated a view 520 in FIG. 5, for presenting the results of the query of STATEMENT 1, the following STATEMENT 2 may be issued to define the view:

STATEMENT 2

CREATE VIEW RESULTS AS
SELECT TONS, PNAME
FROM PRODUCT, SALES
WHERE PRODUCT.PRODNO=SALES.PRODNO;

The data presented by conventional views is gathered and derived on-the-fly from the base tables in response to queries that access the views. This data is not persistently stored after the query accessing the view has been processed. Since the data provided by conventional views is gathered from the base tables at the time the views are accessed, the data from the views will reflect the current state of the base tables. The overhead, however, associated with gathering the data from the base tables for a view every time the view is accessed may be prohibitive, especially if the defining query of the view is expensive to compute.

A materialized view, on the other hand, is a view for which a copy of the view data is stored separately from the base tables of the materialized view. Since the view data is persistently stored, the view data is not required to be regenerated every time a query accesses the view, eliminating overhead associated gathering and deriving the view. In order to provide up-to-date view data, however, materialized views must be maintained to reflect the current state of the base tables. When the base tables of a materialized view are modified, corresponding changes are made to the materialized view. Using a materialized view can lead to a cost savings compared with use of a conventional view when the materialized view presents a set of data that is infrequently changed but frequently accessed, especially when the defining query is costly to calculate.

In general, there are two approaches to causing a materialized view to reflect changes made to its base tables. One approach, referred to as a total refresh, involves discarding the current materialized view data and reissuing the defining query to regenerate the entire materialized view based on the current state of the base tables. Total refresh, thus, incurs a significant performance penalty in regenerating the view, especially for large base tables, and reduces the relative performance benefit of using the materialized view.

The other approach for maintaining a materialized view is referred to herein as incremental maintenance. With incremental maintenance, the entire materialized view is not regenerated every time a base table is changed. Instead, the database server determines what changes, if any, must be made to the materialized view data to reflect the changes made to the base tables. Incremental maintenance significantly reduces the overhead associated with maintaining a materialized view when, for example, changes to the base table only require the insertion or deletion of a single row within the materialized view.

When performing a incremental maintenance on a materialized view that is defined by a join on a plurality of base tables, it is important to control the order of operations performed by concurrent transactions to avoid the "missing updates problem." A transaction is a logical unit of work that comprises one or more databese language statements, terminated by a "commit" or "abort" operation. Concurrent transactions are received and processed by a database server within the same interval of time, for example, simultaneously by parallel execution on multiple processors or asynchronously by interleaved execution on a single processor.

Without proper concurrency control, it is possible for incremental maintenance to erroneously miss a modification to the base tables that should be reflected in the materialized view. Referring to FIG. 6, an example of the missing updates problem is illustrated with respect to a timeline of two transactions that are concurrently executed to modify empty base tables T1 and T2 of a materialized view T12, where T1 has two columns (a, b), T2 has two columns (b, c), and T12 has two columns (a, c) and is defined by: T1 JOIN T2 ON T1.b=T2.b.

At 604, the first transaction makes a modification to base table T1, for example, to insert values (1, 2) into base table T1. At 606, incremental maintenance is performed for the modification, but, since there is no data in the empty base table T2 that satisfies the join condition, no rows are selected for insertion into the materialized view T12.

Shortly thereafter, the second transaction modifies base table T2 to insert the values (2, 3) at 610 and performs incremental maintenance at 612. The data from the first transaction is not yet visible to the second transaction, because the first transaction has not yet committed its transaction. Therefore, since base table Ti still appears to be empty to the second transaction, the incremental maintenance for the second transaction does not select any rows to insert into the materialized view T12.

At 614, the first transaction commits to make the modification to base table T1 final and visible, and, at 618, the second transaction makes its modification to base table T2 final and visible. These modifications, according to the definition of the materialized view T12, should result in the values (1, 3) being inserted therein. The materialized view T1 2, however, remained empty and thus does not correctly reflect the changes to the base tables T1 and T2, because the incremental maintenance by either transaction could not capture the changes by the other transaction.

One known solution to the missing updates problem is to obtain an exclusive lock on all base tables T1 and T2 for performing the incremental maintenance. A lock is a data structure that indicates that a particular process has been granted certain rights with respect to a resource. There are many types of locks. An exclusive lock is a very restrictive lock that prevents other processes from modifying the resource or obtaining other locks on the resource. In some implementations, the exclusive also prevents read accesses to the resource.

FIG. 7 depicts a timeline of two transactions modifying base tables T1 and T2 of materialized view T12 as in FIG. 6, except with exclusive locking concurrency control. At 702, the first transaction requests an exclusive lock on each base table, T1 and T2, of the materialized view T12. This request succeeds immediately, because in this scenario, both base tables T1 and T2 are unlocked. At 704, the first transaction makes a modification to insert values (1, 2) into base table T1. At 706, incremental maintenance is performed for the modification, but, since there is no data in the empty base table T2 that satisfies the join condition, no rows are selected for insertion into the materialized view T12.

Shortly thereafter, the second transaction requests an exclusive lock on base tables T1 and T2 at 708. Since base tables T1 and T2 already have been granted an exclusive lock for the first transaction, the lock request blocks, i.e. suspends, until the pre-existing exclusive lock for base tables T1 and T1 is released. As a result, the intended modification by the second transaction is delayed until the first transaction commits its changes at 714 and releases its exclusive locks at 716. After the first transaction has released the exclusive locks on base tables T1 and T2 at 716, the lock request made by the second transaction back at 708 succeeds at point 718. Thereupon, the second transaction modifies table T2 to insert the values (2, 3) at 720 and performs incremental maintenance at 722. Since the data from the first transaction was committed previously at 714, that data is visible to the second transaction. Therefore, the incremental maintenance for the second transaction is able to select the proper values (1, 3) to insert into the materialized view T12.

The effect of obtaining the exclusive locks serializes transactions to the base tables T1 and T2 of the materialized view T12 and thereby solves the missing updates problem. More specifically, the exclusive locks obtained by the first transaction force the second transaction to wait until the first transaction commits the new data, allowing the second transaction to see the changes made by the first transaction. This serialization also occurs when two transactions make modifications to different records of the same base table. For example, as illustrated in FIG. 8, a first transaction obtains exclusive locks on both base tables T1 and T2 at 802, modifies base table T1 at 804, and performs incremental maintenance at 806. Shortly thereafter, the second transaction requests exclusive locks for base tables T1 and T2 but is blocked until the first transaction commits the changes at 814 and releases the exclusive locks at 816. At 818, the exclusive lock requests for the second transaction finally succeed, thereby allowing the second transaction to modify base table T1 at 820, incrementally maintain the materialized view T12 at 822, commit its changes at 824, and release its locks at 826. Serializing transactions to a table, however, is costly because different transactions are forced to wait for one another, preventing concurrent execution and increasing response time latency.

SUMMARY OF THE INVENTION

There exists a need for a correct and efficient concurrency control methodology for managing transactions that update base tables of a materialized view. Specifically, there is a need to solve the missing updates problem for concurrent transactions to different base tables of the materialized view while reducing the overall response time latency of processing transactions to the base tables.

The present invention stems from the realization that solving the missing updates problem involves serializing concurrent transactions to different base tables of the materialized view, but most of the concurrent data warehousing transactions are made to the same table, the fact table. Therefore, it is desirable to enable concurrent updates of the fact table to proceed without serialization while serializing transactions to different base tables of the materialized view.

These and other needs are addressed by the present invention by locking the base table being updated and the other base tables in the materialized view with different locks. Use of different locks allows concurrent transactions to the same table to proceed, thereby improving performance and latencies, but forces transactions to different tables to be serialized, thereby solving the missing updates problem. Serialization and its attendant performance disadvantages are therefore greatly reduced, since serialization is not performed for most of the data warehousing transactions, i.e. made to the fact table.

Accordingly, one aspect of the invention is a computer-implemented method and a computer-readable medium bearing instructions for maintaining a materialized view, that is defined by a join of a first table and a second table, during a transaction that performs an operation to modify the first table. A first-type lock is obtained on the first table and a second-type lock is obtained on the second table, in which the first-type lock and the second-type lock are different types of locks. After obtaining the first-type lock and the second-type lock, the operation to modify the first table is performed and the materialized view is maintained based on results of performing the operation to modify the first table.

The first-type lock and the second-type lock may be defined so that the first-type lock is obtainable only when the second-type lock is not currently granted and, likewise, the second-type is obtainable only when the first-type lock is not currently granted. For example, a request for a first-type lock would block when a second-type lock is currently granted, and vice versa. In one embodiment, the first-type lock is a row exclusive table lock and the second-type lock is a share table lock. In another embodiment, the first-type lock is a write lock on a subset, such as a row or page, of the first table and the second-type lock is a read lock on the first table.

Another aspect of the invention is a method of maintaining a materialized view, defined by a join of a plurality of based tables. The method includes serially executing transactions if the transactions modify different base tables and incrementally maintain the materialized view. If, on the other hand, the transactions modify the same base table and incrementally maintain the materialized view, those transactions are concurrently executed.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a timeline illustrating a sequence of actions performed according to an embodiment of the present invention by two transactions updating different base tables of a materialized view.

FIG. 4 is a timeline illustrating a sequence of actions performed according to an embodiment of the present invention by two transactions updating the same base table of a materialized view.

DESCRIPTION OF THE PREFERRED EMBODIMENT

A method, apparatus, and article for maintaining materialized views is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

HARDWARE OVERVIEW

Figure 1:
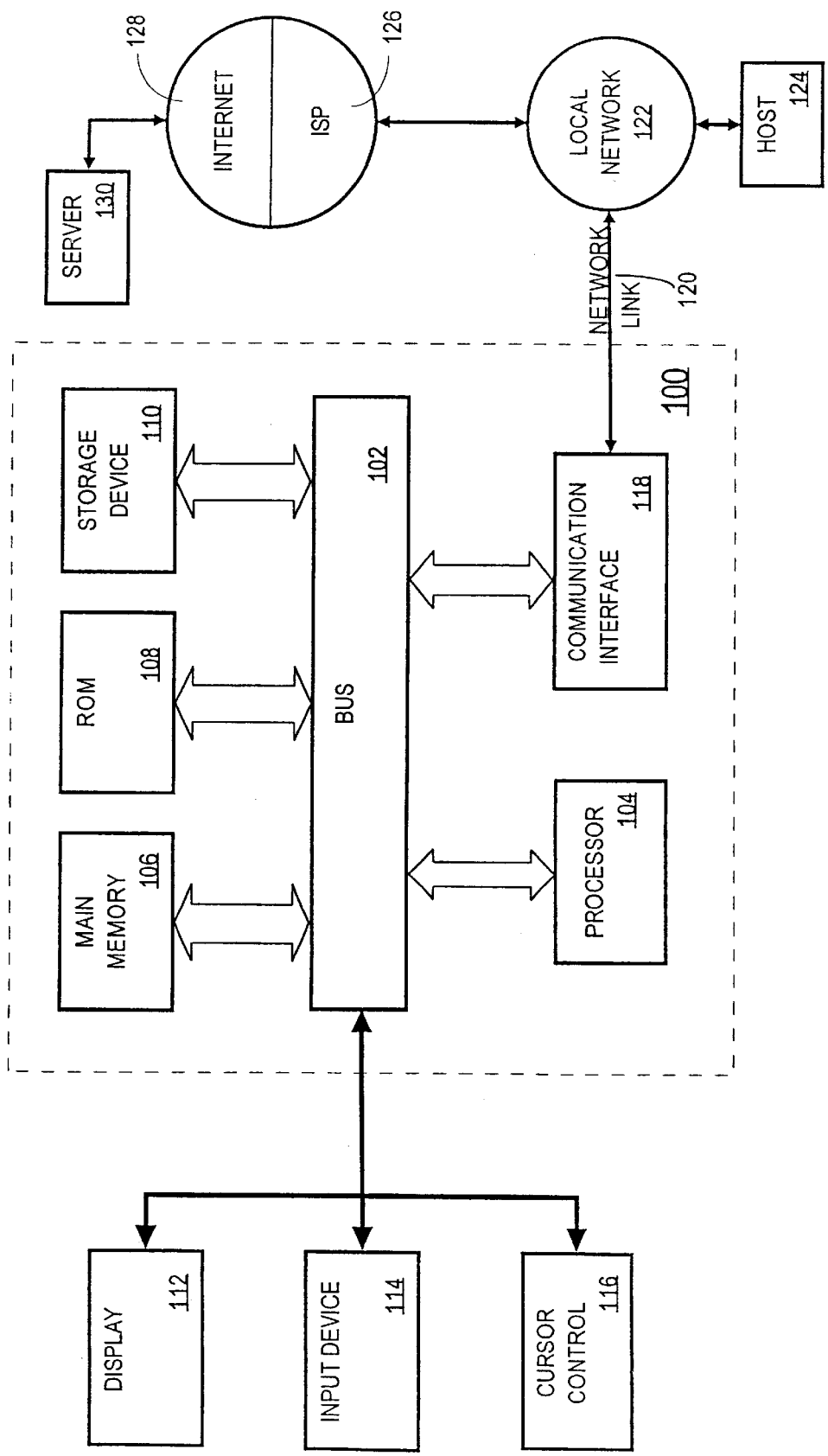
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for maintaining materialized views. According to one embodiment of the invention, maintaining materialized views is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for maintaining materialized views as described herein. The received code may be executed by processor 104 as it is received, and/or stored in storage device 110, or other non-volatile storage for later execution. In this manner, computer system 100 may obtain application code in the form of a carrier wave.

CONCURRENCY CONTROL

According to one aspect of the invention, different types of locks are employed for concurrency control over transactions updating the base tables of a materialized view. A lock is a data structure that indicates that a particular process has been granted certain rights with respect to a resource. The responsibility for servicing requests for locks, as well as other lock-related management tasks, is often managed by a separate process called a lock manager.

According to one embodiment of the invention, one type of lock, referred to herein as a "first-type lock," is obtained by an entity that updates a base table of a materialized view for the base table actually being updated, and a different type of lock, referred to herein as a "second-type lock," is obtained for the other base tables of the materialized view. While the name and nature of these locks will vary from implementation to implementation, it is preferable to use locks with the following properties:

The first-type lock is obtained on the base table being updated. The first-type lock is defined to block other transactions from obtaining the second-type lock on the base table being updated but allow other transactions to obtain first-type locks to update another portion of the same base table. First-type locks on the same row will still block each other, of course. In some implementations, for example in a consistent read environment, the first-type lock can be a row exclusive (RX) table lock, also known as a sub-exclusive (SX) table lock. In other implementations, the first-type lock can be a write lock on the row, page, or other subset of the table being updated.

The second-type lock is obtained on the other base tables of the materialized view. The second-type lock is defined to allow other transactions to obtain second-type locks on a table but block the other transactions from obtaining a first-type lock on the table. In some implementations, such as in the consistent read environment, the second-type lock can be a share (S) table lock. In other implementations, the second-type lock can be a read lock on the entire table.

The first-type lock and the second-type lock interact in the following manner. If two transactions attempt to concurrently update the same table, for example a fact table, then both transactions will attempt to obtain the first-type lock on the same table and the second-type lock on the other base tables involved in the materialized view, for example dimension tables. Since the first-type lock and the second-type lock are defined to allow the locks of the same type to be placed on the table, both these transactions are able to update the same table concurrently. In a data warehousing environment, in which most of the transactions are made to the same fact table, these transactions to the same table can be performed concurrently.

On the other hand, if two transactions attempt to concurrently update different tables, for example, a fact table and a dimension table, then both transactions will attempt to obtain locks of different types on both tables. For example, the transaction attempting to update the fact table will request a first-type lock on the fact table and a second-type lock on the dimension table, while the transaction attempting to update the dimension table will request a second-type lock on the fact table and a first-type lock on the dimension table. Accordingly, the second transaction in time will block until the first transaction in time releases the locks, thereby serializing the transactions and incremental maintenance of the materialized view.

Figure 2:
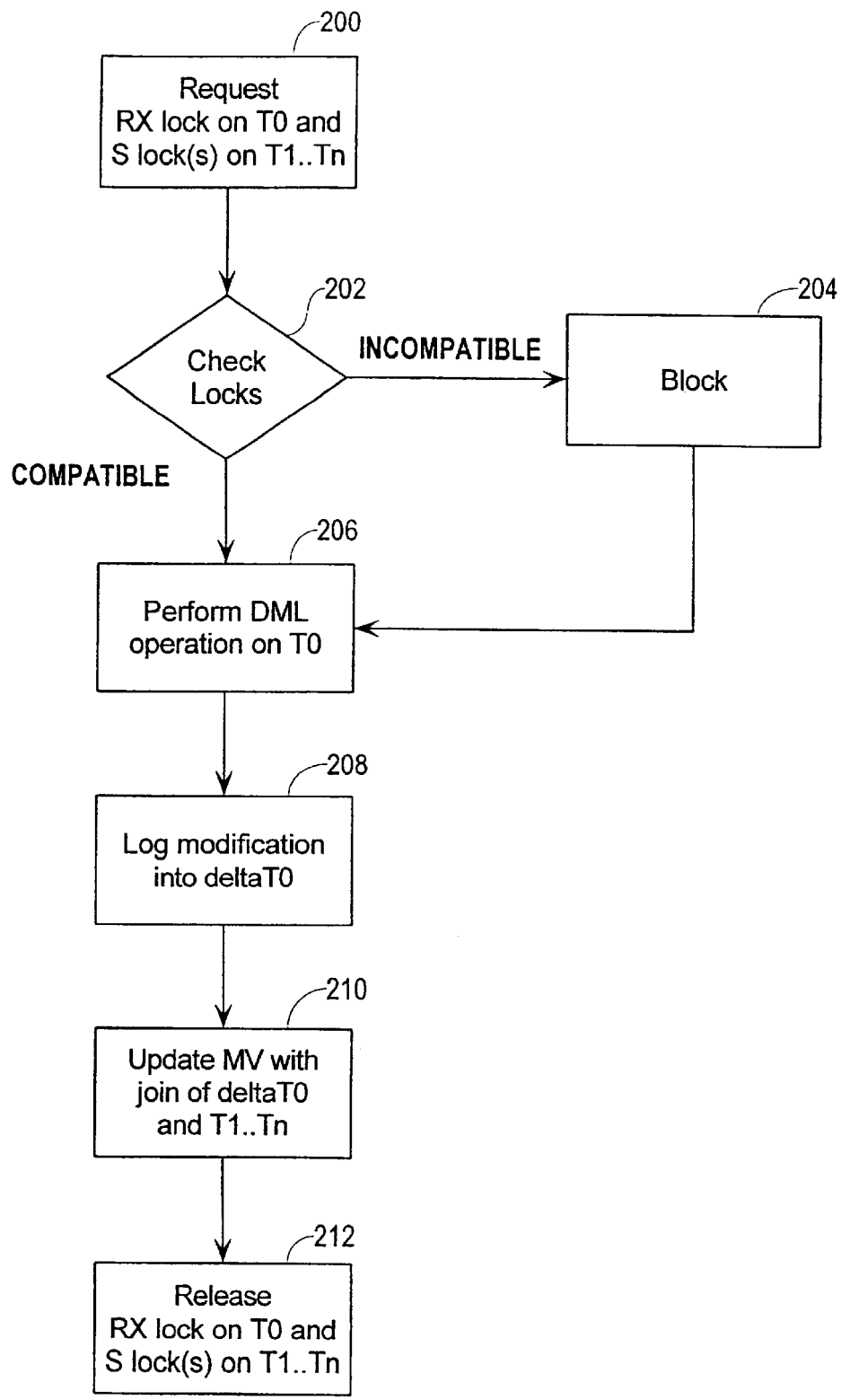
FIG. 2 is a flowchart illustrating steps for locking a table for incremental maintenance of a materialized view in accordance with an embodiment of the present invention.
Figure 5:
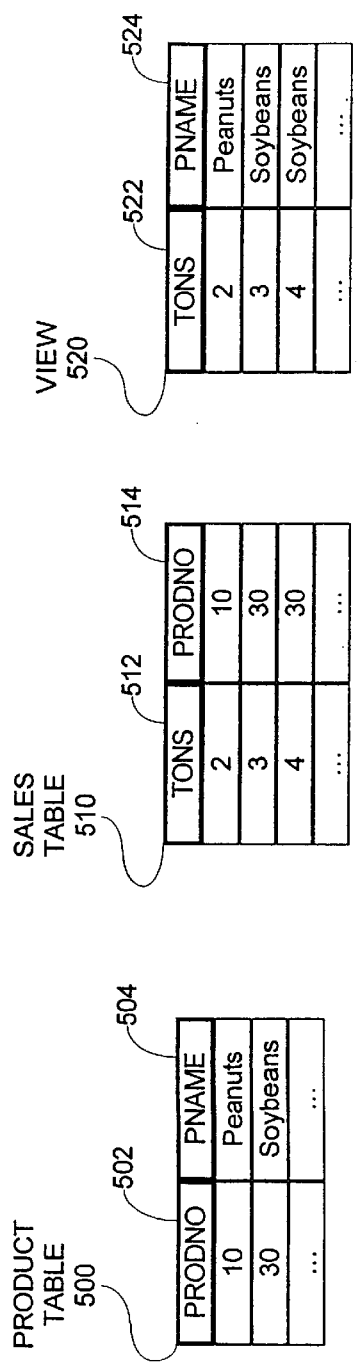
FIG. 5 depicts an exemplary database containing base tables of a materialized view.
Figure 6:
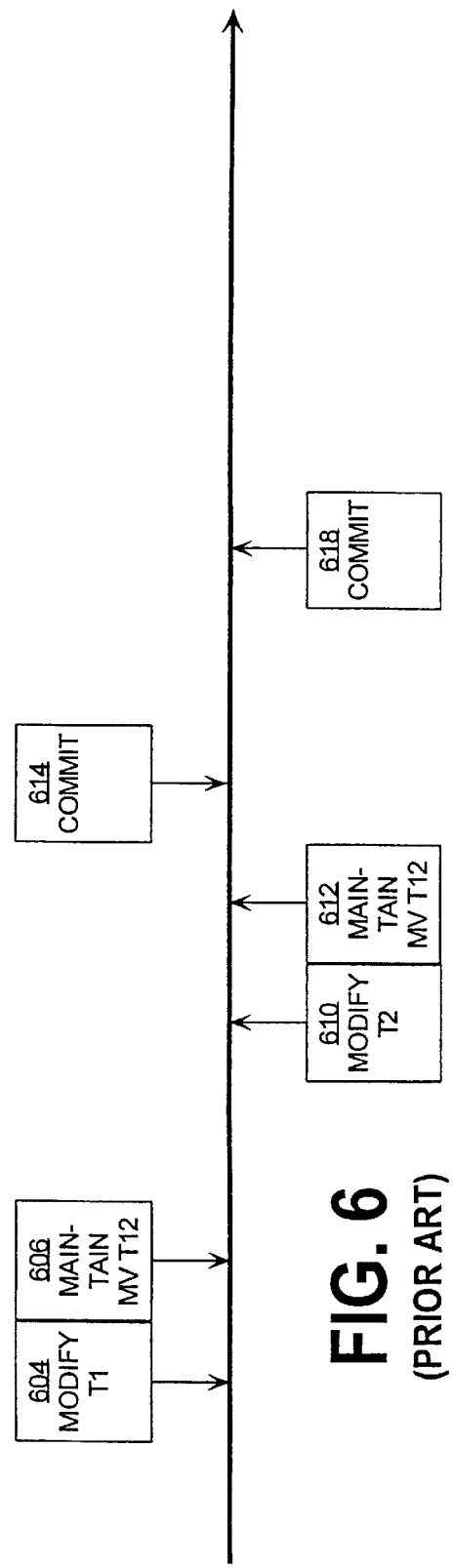
FIG. 6 is a timeline illustrating a sequence of actions by two transactions updating different base tables of a materialized view that result in the missing updates problem.
Figure 7:
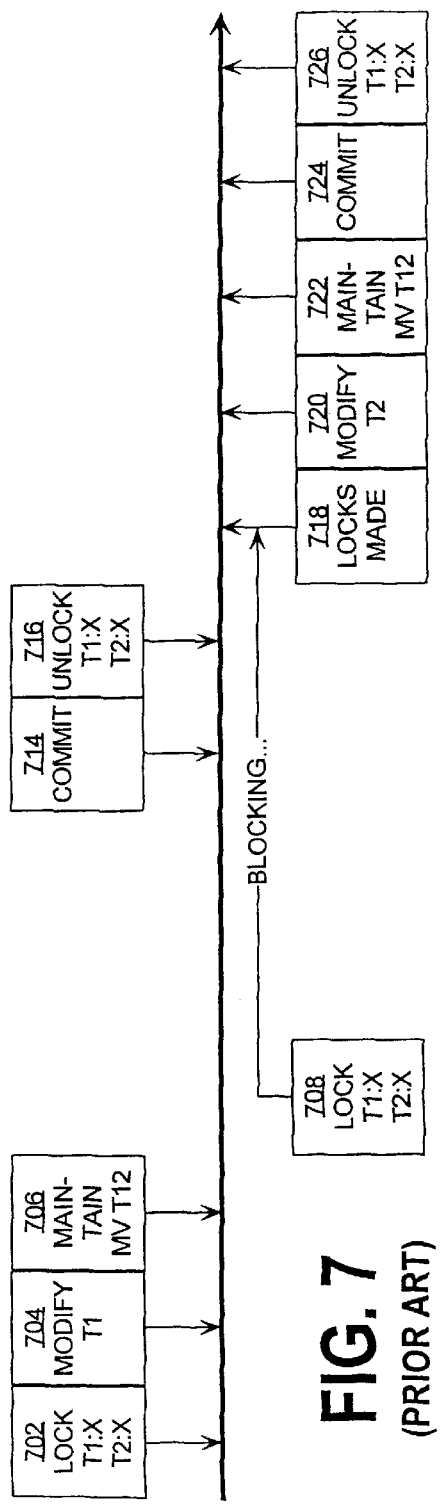
FIG. 7 is a timeline illustrating a sequence of actions performed according to a conventional methodology by two transactions updating different base tables of a materialized view.
Figure 8:
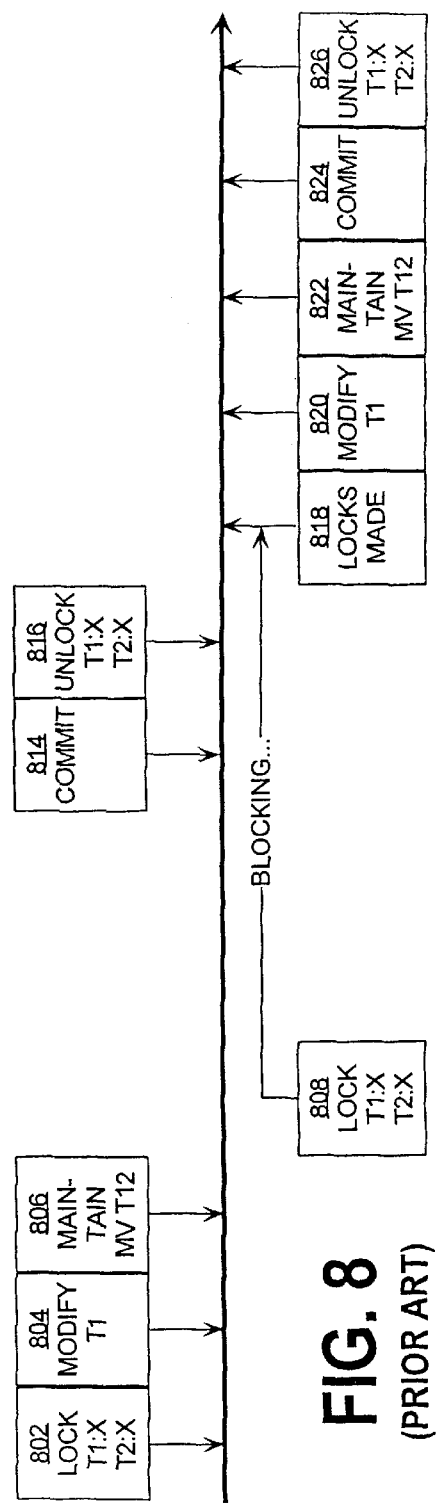
FIG. 8 is a timeline illustrating a sequence of actions performed according to a conventional methodology by two transactions updating the same base table of a materialized view.

FIG. 2 is a flowchart illustrating the concurrency control in accordance with one embodiment of the present invention, performed by a process within a transaction to update base table T0 of a materialized view defined by a join on base table T0 and other base tables T1 . . . Tn. At step 200, the process requests an RX lock on base table T0 and S locks on base tables T1 . . . Tn, for example, from a lock manager. Thus, the type of the lock requested on the base table to be update differs from the type of the locks requested for the other base tables.

At step 202, the lock manager checks to determine if the lock request on the base tables is compatible with the locks already granted on the base tables. As explained hereinabove, a first-type lock such as an RX table lock is compatible with other first-type locks (RX table locks) but incompatible with a second-type lock, i.e. the S table lock. Similarly, the second-type lock such as the S table lock is compatible with other second-type locks (S table lock) but incompatible with a first-type lock, i.e. the RX table lock.

If the lock request is incompatible with the locks already granted on the table, then the process blocks in step 204 until the incompatible locks are released or, in some embodiments, upon deadlock detection, in which case the entire transaction is rolled back. After the locks are granted when the incompatible locks are not currently granted for the table, execution proceeds to step 206. Incompatible locks will generally exist when different base tables are being updated, but compatible locks will generally exist when the same base table is concurrently updated.

At step 206, one or more DML (Data Manipulation Language) operations are performed on the base table TO to modify the base table such as add, delete, or update rows of the base table TO. Steps 208 and 210 relate to one implementation of incremental maintenance of the corresponding materialized view. In one embodiment, the change is first logged into a log file deltaT0 corresponding to the base table TO (step 208). After one or more changes were logged into the deltaT0 log file, the materialized view is updated by a join of the deltaT0 log file and the other base tables T1 . . . Tn (step 210). When the updating is completed, the changes are committed in step 211. At step 212, the RX lock on base table TO and the S locks on the other base tables T1 . . . Tn are released. Consequently, any other process executing a transaction that was blocked is now able to obtain the incompatible locks that were requested for the base table TO and continue operation.

FIG. 3 illustrates a scenario in which two processes executing respective transactions attempt to modify different base tables T1 and T2 respectively of a materialized view T12. As explained hereinabove, the modifications to base tables T1 and T2 must be serialized in order to avoid the missing updates problem. At 302, the first transaction requests an RX table lock on base table T1 and an S table lock on base table T2. At 304, the base table T1 is updated, for example, to add values (1, 2) to base table T1. At 306, incremental maintenance is performed for materialized view T12. Since no other change has occurred, the incremental maintenance does not add any new rows to the materialized view T12.

Shortly thereafter, the second transaction, attempting to update base table T2, requests an S table lock on base table T1 and an RX table lock on base table T2 at 308. Since base tables T1 and T2 already have been granted incompatible locks for the first transaction, the lock request blocks or suspends, until the pre-existing locks for base tables T1 and T1 are released. As a result, the intended modification by the second transaction is delayed until the first transaction commits its changes at 314 and releases its own locks at 316.

After the first transaction has released the RX table lock on base table T1 and the S table lock on base table T2 at 316, the lock request made by the second transaction back at 308 succeeds at point 318. Thereupon, the second transaction modifies base table T2 to insert the values (2, 3) at 320 and performs incremental maintenance at 322. Since the data from the first transaction was committed previously at 314, that data is visible to the second transaction. Therefore, the incremental maintenance for the second transaction is able to select the proper values (1, 3) to insert into the materialized view T12, and the missing updates problem is avoided. Finally, the second transaction commits its own changes at 324 and releases its locks on base tables T1 and T2.

In another scenario, when two transactions attempt to update the same base table, for example base table T1, serialization does not occur and the updates are allowed to be performed concurrently. As illustrated in the timeline of FIG. 4, a first transaction obtains an RX table lock on base table T1 and an S table lock on base table T2 at 402, modifies the base table T1 at 404, and performs incremental maintenance at 406. Shortly thereafter, the second transaction also requests an RX table lock for base table T1 and an S table lock for base table T2 at 408. Since the locks are compatible, i.e. the same lock type is being requested for each base table T1 and T2, the second transaction is allowed to concurrently modify table T1 at 410, and incrementally maintain the materialized view T12 at 412. Both modifications to the base table T1 are reflected in the materialized view T12. Finally, the first transaction commits its changes at 414 and release its locks at 416, and the second transaction commits its changes at 418 and release its locks at 420. Since the second transaction is not forced to block, concurrent updates to the same base table T1 is performed concurrently.

Therefore, a methodology is described wherein transactions to different base tables of a materialized view are serially executed, thereby solving the missing updates problem, and transactions to the same base table of the materialized view are concurrently executed, thereby improving performance and response time latencies.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of maintaining a materialized view, defined by a join of a first table and a second table, during a transaction that performs a operation to modify the first table, said method comprising the computer-implemented steps of:

obtaining a first-type lock on the first table;

obtaining a second-type lock on the second table, wherein the first-type lock and the second-type lock are different types of locks;

after obtaining the first-type lock and obtaining the second-type lock, performing the operation to modify the first table; and maintaining the materialized view based on results of performing the operation to modify the first table.

2. The method of claim 1, further comprising the step of releasing the first-type lock on the first table and the second-type lock on the second table after said maintaining the materialized view based on the results.

3. The method of claim 1, wherein:

the step of obtaining the first-type lock on the first table includes obtaining a first-type lock on the first table when a lock of the second-type is not currently granted on the first table; and the step of obtaining the second-type lock on the second table includes obtaining a second-type lock on the second table only when a lock of the first-type is not currently granted on the second table.

4. The method of claim 3, wherein:

the step of includes obtaining a first-type lock on the first table when a lock of the second-type is not currently granted on the first table includes waiting for the second-type on the first table to be released; and the step of includes obtaining a second-type lock on the first table when a lock of the first-type is not currently granted on the first table includes waiting for the first-type on the first table to be released.

5. The method of claim 1, wherein the step of obtaining the first-type lock on the first table includes obtaining permission to modify rows of the first table.

6. The method of claim 5, wherein the step of obtaining the second-type lock on the first table includes denying permission to modify rows of the second table during another concurrent transaction.

7. The method of claim 1, wherein the first-type lock is a row exclusive table lock and the second-type lock is a share table lock.

8. The method of claim 1, wherein the first-type lock is a write lock on a subset of the first table and the second-type lock is a read lock on all of the second table.

9. The method of claim 1, wherein the first table is a fact table and the second table is a dimension table.

10. A method of maintaining a materialized view, defined by a join of a plurality of tables, said method comprising the computer-implemented steps of:

if a first transaction and a second transaction modify different tables of the plurality of tables and incrementally maintain the materialized view, then serially executing the first transaction and the second transaction; and if the first transaction and the second transaction modify a same table of the plurality of tables and incrementally maintain the materialized view, then concurrently executing the first transaction and the second transaction.

11. A computer-readable medium bearing instructions for maintaining a materialized view, defined by a join of a first table and a second table, during a transaction that performs a operation to modify the first table, said instructions arranged, when executed by one or more processors, to cause the one or more processors to perform the steps of:

obtaining a first-type lock on the first table;

obtaining a second-type lock on the second table, wherein the first-type lock and the second-type lock are different types of locks;

after said obtaining the first-type lock and said obtaining the second-type lock, performing the operation to modify the first table; and maintaining the materialized view based on results of said performing the operation to modify the first table.

12. The computer-readable medium of claim 11, wherein said instructions are further arranged to cause the one or more processors to perform the step of releasing the first-type lock on the first table and the second-type lock on the second table after said maintaining the materialized view based on the results.

13. The computer-readable medium of claim 11, wherein:
the step of obtaining the first-type lock on the first table includes obtaining a first-type lock on the first table when a lock of the second-type is not currently granted on the first table; and
the step of obtaining the second-type lock on the second table includes obtaining a second-type lock on the second table when a lock of the first-type is not currently granted on the second table.

14. The computer-readable medium of claim 11, wherein the step of obtaining the first-type lock on the first table includes obtaining permission to modify rows of the first table.

15. The computer-readable medium of claim 14, wherein the step of obtaining the second-type lock on the first table includes denying permission to modify rows of the second table during another concurrent transaction.

16. The computer-readable medium of claim 11, wherein the first-type lock is a row exclusive table lock and the second-type lock is a share table lock.

17. The computer-readable medium of claim 11, wherein the first-type lock is a write lock on a subset of the first table and the second-type lock is a read lock on all of the second table.

18. The computer-readable medium of claim 11, wherein the first table is a fact table and the second table is a dimension table.

19. The computer-readable medium of claim 3, wherein:
the step of includes obtaining a first-type lock on the first table when a lock of the second-type is not currently granted on the first table includes waiting for the second-type on the first table to be released; and
the step of includes obtaining a second-type lock on the first table when a lock of the first-type is not currently granted on the first table includes waiting for the first-type on the first table to be released.

20. A computer-readable medium bearing instructions for maintaining a materialized view, defined by a join of a plurality of tables, said instructions arranged, when executed by one or more processors, to cause the one or more processors to perform the steps of:
if a first transaction and a second transaction modify different tables of the plurality of tables and incrementally maintain the materialized view, then serially executing the first transaction and the second transaction; and
if the first transaction and the second transaction modify a same table of the plurality of tables and incrementally maintain the materialized view, then concurrently executing the first transaction and the second transaction.

* * * * *